Feb. 19, 1957 J. A. LABBEE, JR 2,781,807
EXPANDING BIT SCREW DRIVER
Filed Feb. 19, 1953
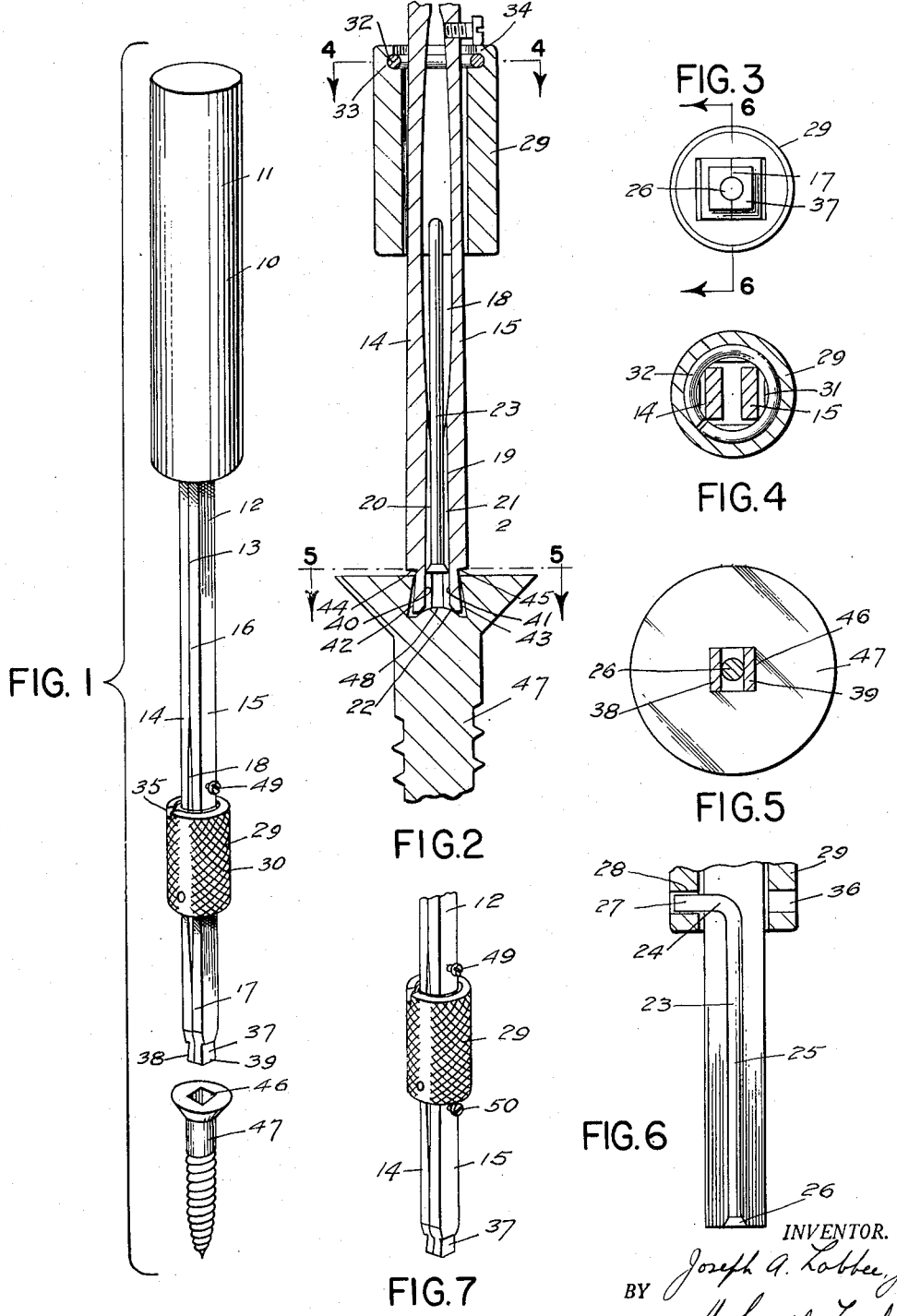
INVENTOR.
Joseph A. Labbee, Jr.
BY Nathaniel Frucht
ATTORNEY

United States Patent Office 2,781,807
Patented Feb. 19, 1957

2,781,807

EXPANDING BIT SCREW DRIVER

Joseph A. Labbee, Jr., Providence, R. I.; Katherine G. Labbee, administratrix of said Joseph A. Labbee, Jr., deceased Application February 19, 1953, Serial No. 337,773

3 Claims. (Cl. 145—50)

This is a continuation in part of application Serial No. 326,917, filed December 19, 1952, for Screw Driver and the Like.

The present invention relates to fastening tools and has particular reference to a screw driver construction for use with screws and other fastening devices having head cavities.

The principal object of the invention is to provide a screw driver which may be positively locked within a screw head cavity.

Another object of the invention is to provide a screw driver which has a tip adjustable to freely enter into a screw head cavity and to grip seat after entering.

An additional object of the invention is to provide a screw driver having a split tip which may be freely inserted into a screw head cavity having diverging walls, and then spread to grip the cavity walls.

A further object of the invention is to provide a screw driver having a split tip and a cam actuator for positive separation thereof.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Fig. 1 is a perspective view of a screw driver embodying the invention, and a screw having a head cavity for actuation therewith;

Fig. 2 is an enlarged longitudinal cross-section of the screw driver in locked relation to a screw, parts being broken away;

Fig. 3 is a bottom view of the screw driver of Fig. 1, the parts being in normal position for insertion in a screw head cavity;

Fig. 4 is a cross sectional view on the line 4—4 of Fig. 2;

Fig. 5 is a bottom view of the screw driver showing the parts when the screw driver is lock inserted in a screw head cavity;

Fig. 6 is a cross sectional view on the line 5—5 of Fig. 1; and

Fig. 7 is a perspective view similar to Fig. 1 of a modified screw driver construction, parts being broken away.

It has been found advisible to provide a screw driver with a spreadable tip adapted for insertion into a screw head cavity, the tip being positively held separated for locking within the cavity. To this end, I mount a longitudinally split shank into a screw driver handle, whereby two separable longitudinal parts are provided, forming a split tip with terminal tongue parts. The split is lineal at both the lower portion and the upper portion of the shank, the lower portion of the shank including a vertical longitudinal bore, the lower end having an enlarged mouth. Intermediate the lower and upper portions, the split widens to provide an elongated oval shaped slot into which the upper end of a bent pin extends horizontally with its terminus seated within a transverse wall passage of a shell ring slidably positioned over the shank. The remainder of the pin extends vertically downwardly between the two separable parts, and is slidably held within the bore and terminates in an enlarged bell-shaped cam element. Movement of the shell ring controls the operation of the split tongue, which is shaped to mate with the screw head cavity into which it fits, through engagement of the cam element with the separable tongue parts. The tongue parts are normally in position for insertion into the screw head cavity when the ring is in its lowered position; movement of the ring upwardly after the tongue parts have been inserted into the screw head cavity spreads the tongue parts, forcing them against the walls of the cavity and locking them therein.

Referring to the drawings, the screw driver 10 has a cylindrical handle 11 of standard type, with an elongated shank 12 which is preferably of rectangular cross-section and is locked within one end of the handle. The shank is longitudinally split as indicated at 13, see Fig. 1, to provide two separable parts 14, 15, whereby the shank obtains a degree of flexibility in that the parts may be selectively spread apart. The split is lineal as its upper portion 16 and its lower portion 17, and widens intermediate these portions to provide an elongated oval shaped slot 18. The shank includes a vertical split bore 19 of generally uniform diameter extending centrally through the shank from the lower end of the slot 18, the split bore side walls providing recesses 20, 21 in the inner walls of the separable parts, and the split bore having a terminal mouth 22 of enlarged diameter.

An actuating member 23, preferably made of wire stock and of generally uniform diameter, is bent at right angles as shown at 24 to provide a vertical rod 25, terminating in a truncated cone shaped cam element 26, and a horizontal upper pin end 27 which is slidably mounted within the shank with the pin end 27 extending through the slot 18 and seating at its terminus within a transverse wall opening 28 of a shell ring 29 which is positioned around the shank. The rod 25 slides within the bore, the cam element 26 normally nesting within the enlarged mouth 22. The ring 29 is knurled on the outside as shown at 30 for easy gripping, and includes a generally rectangular bore 31 adapted to slidably receive the shank and has a spring ring 32 positioned within a circular groove 33 cut inside the top of the inner wall of the ring and having an upper annular flange 34, the spring ring 32 being set therein to exert pressure on the edges of the shank, whereby the ring is releasably maintained in set position. A rectangular slot 35 extends through the flange into the groove 33 to facilitate insertion and removal of the spring ring when necessary. A hole 36 in vertical alignment with hole 28 extends through the ring 30, whereby the pin end 27 may more easily be directed to seat within the hole 28.

The shank tip 37 is recessed to provide split tongue parts 38, 39 having parallel inner faces as indicated at 40, 41, and outer inclined faces 42, 43, which taper upwardly and terminate abruptly to provide two abutment shoulders or lips 44, 45, whereby the split tongue may be engaged within a recessed head cavity 46 of a screw 47 which has a central upstanding dome 48 adapted to be seated within the enlarged mouth 22 when the split tongue is inserted in the screw cavity. The two abutments are adapted to rest against the head of the screw when the tongue is engaged with the head cavity. This type of screw is disclosed in my co-pending application, Serial No. 326,917, filed December 19, 1952, for Screw Driver and the Like.

In order that the tongue may be easily inserted into the screw head cavity, the cross sectional area of the bottom of the tongue when the separable parts are in closed relation, is slightly less than the cross sectional area of the inlet to the screw head cavity.

A screw 49 extends outwardly from the separable part 15 above the shell ring and acts as a stop for the upward movement of the shell ring. A similar screw 50 may be positioned below the shell ring as shown in Fig. 7 of my modified construction, to stop downward movement of the shell ring and the actuating member 23, when the split tongue parts are in closed relation.

It is now clear that the novel construction provides a screw driver with a sectional shank, which is selectively adjusted for insertion into a screw head cavity and for locking therein to provide a firm threading and unthreading grip. The screw tip has a split tongue which is spread after insertion within the screw head cavity to become locked therein, by cam action resulting from the upward sliding of a ring positioned around the shank. Since the shank has a longitudinal split and a central bore with an enlarged mouth, a vertical rod carrying a cam which is slidably mounted within the bore between the split sections of the shank is lifted when the shell ring is moved upwardly, to spread the tongue parts within the screw head cavity. Movement of the ring downwardly forces the rod and cam down so that the cam element seats in the enlarged mouth resulting in the closing of the split in the tip, whereby the screw driver may be detached from the screw.

Although I have described a specific constructional feature of my invention, it is obvious that changes in the size, shape and arrangement of the parts may be made to meet other requirement, without departing from the spirit and the scope of the invention as defined in the appended claims.

I claim:

1. A fastening tool having a handle and a shank, said shank having a tip for insertion into a screw head cavity, said shink and tip being longitudinally split forming two longitudinally separable parts selectively movable outwardly away from each other and inwardly towards each other, a longitudinal bore through said shank, the side walls of said bore forming recesses in the inner walls of the separable parts, the bottom end of said bore having an enlarged diameter, and means slidably mounted on said shank and engaging the separable parts, said means including a shell ring around said shank, an actuating pin in said bore having its upper end secured to said shell ring, and a cam element integral with the free end of said pin, said means being selectively movable upwardly whereby said cam element moves said separable parts outwardly away from each other, and movable downwardly whereby said actuating pin moves said cam element into the enlarged bore end and said ring moves said separable parts inwardly towards each other, each of said tip portions including a recess on its outer side face having a longitudinally extending inclined wall and an abutment transverse shoulder, whereby the split tip may be engaged within the screw head cavity.

2. The structure of claim 1 wherein the shank is of rectangular cross section and the ring bore is of corresponding rectangular cross section.

3. The structure of claim 2 wherein the shell ring includes a spring ring mounted therein contacting the longitudinal shank.

References Cited in the file of this patent

UNITED STATES PATENTS

| | | |
|---|---|---|
| 545,331 | Balsley | Aug. 27, 1895 |
| 772,912 | Allam | Oct. 25, 1904 |
| 1,108,299 | Wisman | Aug. 25, 1914 |
| 1,688,181 | Fink | Oct. 16, 1928 |
| 1,758,162 | Lemieux | May 13, 1930 |
| 2,233,232 | Wilkinson | Feb. 25, 1941 |
| 2,313,710 | Gemmell | Mar. 9, 1943 |
| 2,506,922 | Hansen | May 9, 1950 |
| 2,601,260 | Calfee | June 24, 1952 |

FOREIGN PATENTS

| | | |
|---|---|---|
| 12,274 | Great Britain | Jan. 11, 1912 |
| 881,205 | France | Apr. 19, 1943 |